(12) United States Patent
Mazzarese et al.

(10) Patent No.: US 9,419,691 B2
(45) Date of Patent: Aug. 16, 2016

(54) DATA TRANSMISSION METHOD AND APPARATUS

(71) Applicant: Huawei Technologies Co., Ltd., Shenzhen, Guangdong (CN)

(72) Inventors: David Mazzarese, Beijing (CN); Jingyuan Sun, Beijing (CN); Xiaotao Ren, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 145 days.

(21) Appl. No.: 14/536,239

(22) Filed: Nov. 7, 2014

(65) Prior Publication Data

US 2015/0055614 A1    Feb. 26, 2015

Related U.S. Application Data

(63) Continuation of application No. PCT/CN2012/075266, filed on May 9, 2012.

(51) Int. Cl.
*H04B 7/02* (2006.01)
*H04B 7/06* (2006.01)
*H04L 5/00* (2006.01)
*H04L 27/26* (2006.01)

(52) U.S. Cl.
CPC .............. *H04B 7/024* (2013.01); *H04B 7/0626* (2013.01); *H04L 5/0044* (2013.01); *H04L 5/0048* (2013.01); *H04L 5/0057* (2013.01); *H04L 5/0007* (2013.01); *H04L 27/2613* (2013.01)

(58) Field of Classification Search
None
See application file for complete search history.

(56) References Cited

U.S. PATENT DOCUMENTS

| | | | |
|---|---|---|---|
| 2010/0272032 A1 | 10/2010 | Sayana et al. | |
| 2012/0201164 A1* | 8/2012 | Jongren | H04L 5/0048 370/252 |

(Continued)

FOREIGN PATENT DOCUMENTS

| | | |
|---|---|---|
| CN | 102215182 A | 10/2011 |
| CN | 102368759 A | 3/2012 |

(Continued)

OTHER PUBLICATIONS

"Correction on overlapping non-zero-power and zero-power CSI-RS configurations", Renesas Mobile Europe Ltd., et al., Change Request, 3GPP TSG-RAN WG1 Meeting #65, May 9-13, 2011, 2 pages.

(Continued)

*Primary Examiner* — Gary Mui

(57) ABSTRACT

Embodiments of the present invention provide a data transmission method that relates to the field of communications technologies and is invented for effectively improving the spectrum efficiency of data transmission. The data transmission method includes: mapping, to a resource element according to a preset rule, data that needs to be transmitted to a user equipment, where the preset rule includes: mapping data to the resource element corresponding to a non-zero power CSI-RS in a first set of the user equipment, unless the resource element is a specific resource element, where the specific resource element includes a resource element that is among the resource elements corresponding to the non-zero power CSI-RS in the first set and overlaps a resource element corresponding to a zero power CSI-RS; and transmitting the mapped data to the user equipment. The present invention is applicable to a radio communications system such as Long Term Evolution.

18 Claims, 2 Drawing Sheets

---

Step 101: A base station maps, to an RE according to a preset rule, data that needs to be transmitted to a UE, where the preset rule includes: mapping data to an RE corresponding to a non-zero power channel state information reference signal CSI-RS in a first set of the UE, unless the RE is a specific RE, where the specific RE includes an RE, that is among the REs corresponding to the non-zero power CSI-RS in the first set and overlaps an RE corresponding to a zero power CSI-RS Step 102: The base station transmits the mapped data to the UE

(56) References Cited

U.S. PATENT DOCUMENTS

| | | | | |
|---|---|---|---|---|
| 2013/0242778 | A1* | 9/2013 | Geirhofer | H04L 1/0026 370/252 |
| 2014/0153526 | A1* | 6/2014 | Mazzarese | H04B 7/024 370/329 |
| 2014/0307576 | A1* | 10/2014 | Nagata | H04L 1/0001 370/252 |

FOREIGN PATENT DOCUMENTS

| | | |
|---|---|---|
| CN | 102415176 A | 4/2012 |
| CN | 102448117 A | 5/2012 |
| EP | 2 448 345 A2 | 5/2012 |
| EP | 2 573 953 A2 | 3/2013 |
| WO | WO 2011/145886 A2 | 11/2011 |
| WO | WO 2012/024321 A2 | 2/2012 |

OTHER PUBLICATIONS

"Remaining Issues on CSI-RS", LG Electronics, 3GPP TSG RAN WG1 Meeting #65, May 9-13, 2011, 5 pages.

"CSI-RS configurations for CoMP", ZTE, 3GPP TSG RAN WG1 Meeting #67, Nov. 14-18, 2011, 3 pages.

"Zero-power and non-zero power CSI-RS configurations", Fujitsu, 3GPP TSG-RAN WG1 #68, Feb. 6-10, 2012, 5 pages.

"Extended Wait Time in RRC Connection Reject for MTC", LG Electronics Inc., 3GPP TSG-RAN WG2 #72, Nov. 15-19, 2010, 2 pages.

"The CN domain for Extended Wait time", CATT, 3GPP TSG WG2 Meeting #75, Aug. 22-26, 2011, 2 pages.

* cited by examiner

Step 101: A base station maps, to an RE according to a preset rule, data that needs to be transmitted to a UE, where the preset rule includes: mapping data to an RE corresponding to a non-zero power channel state information reference signal CSI-RS in a first set of the UE, unless the RE is a specific RE, where the specific RE includes an RE, that is among the REs corresponding to the non-zero power CSI-RS in the first set and overlaps an RE corresponding to a zero power CSI-RS Step 102: The base station transmits the mapped data to the UE

FIG. 1

Step 201: A UE determines, according to a preset rule, an RE to which data is mapped, where the preset rule includes: mapping data to an RE corresponding to a non-zero power CSI-RS in a first set, unless the RE is a specific RE, where the specific RE includes an RE that is among the REs corresponding to the non-zero power CSI-RS in the first set and overlaps an RE corresponding to a zero power CSI-RS Step 202: The UE receives, on the determined RE to which data is mapped, data transmitted by a base station

FIG. 2

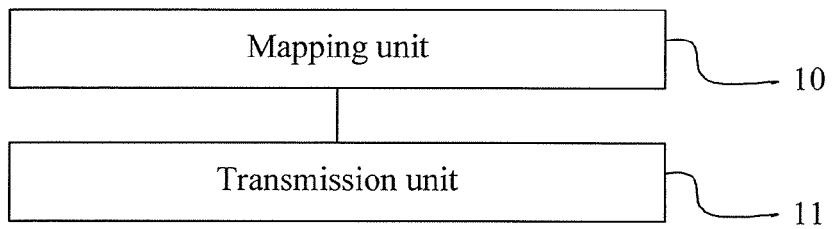

FIG. 3

DATA TRANSMISSION METHOD AND APPARATUS

CROSS-REFERENCE TO RELATED APPLICATIONS

This application is a continuation of International Patent Application No. PCT/CN2012/075266 filed on May 9, 2012, which is hereby incorporated by reference in its entirety.

TECHNICAL FIELD

The present invention relates to the field of communications technologies, and in particular, to a data transmission method and apparatus.

BACKGROUND

In a wireless communications system, a user equipment UE (User Equipment) needs to perform various types of measurement related to a downlink channel, including: reference signal received power RSRP (Reference Signal Received Power)/reference signal received quality RSRQ (Reference Signal Received Quality) measurement, channel state information CSI (Channel State Information) measurement, and the like. In the 3rd Generation Partnership Project 3GPP (3rd Generation Partnership Project) Long Term Evolution LTE (Long Term Evolution) Rel 10 protocol, a base station sends a non-zero power channel state information reference signal CSI-RS to a UE within coverage of the base station for CSI measurement; while in the 3GPP LTE Rel 11, that a UE performs CSI-RS RSRP measurement based on a non-zero power CSI-RS is introduced.

The base station configures multiple CSI-RS resources for the UE, including: a non-zero power CSI-RS resource and a zero power CSI-RS resource. When data is transmitted to the UE, REs (Resource Element) that correspond to all the CSI-RS resources configured for the UE by the base station cannot be used for mapping data; therefore, more REs of configured as non-zero power CSI-RS resources or zero power CSI-RS resources indicate fewer REs that can be used for transmitting data, and the spectrum efficiency of data transmission is relatively low.

SUMMARY

A main objective of embodiments of the present invention is to provide a data transmission method and apparatus, which can effectively improve spectrum efficiency of data transmission.

In order to achieve the foregoing objective, the following technical solutions are used in the embodiments of the present invention.

A data transmission method includes:

mapping, to an RE according to a preset rule, data that needs to be transmitted to a UE, where the preset rule includes:

mapping data to an RE corresponding to a non-zero power channel state information reference signal CSI-RS in a first set of the UE, unless the RE is a specific RE, where the specific RE includes an RE that is among the REs corresponding to the non-zero power CSI-RS in the first set and overlaps an RE corresponding to a zero power CSI-RS; and transmitting the mapped data to the UE.

A data transmission method includes:

determining, according to a preset rule, an RE to which data is mapped, where the preset rule includes: mapping data to an RE corresponding to a non-zero power CSI-RS in a first set, unless the RE is a specific RE, where the specific RE includes an RE that is among the REs corresponding to the non-zero power CSI-RS in the first set and overlaps an RE corresponding to a zero power CSI-RS; and receiving, on the determined RE to which data is mapped, data transmitted by a base station.

A base station includes:

a mapping unit, configured to map, to an RE according to a preset rule, data that needs to be transmitted to a UE, where the preset rule includes:

mapping data to an RE corresponding to a non-zero power channel state information reference signal CSI-RS in a first set of the UE, unless the RE is a specific RE, where the specific RE includes an RE that is among the REs corresponding to the non-zero power CSI-RS in the first set and overlaps an RE corresponding to a zero power CSI-RS; and a transmission unit, configured to transmit, to the UE, the data mapped by the mapping unit.

A UE includes:

a resource determining unit, configured to determine, according to a preset rule, an RE to which data is mapped, where the preset rule includes: mapping data to an RE corresponding to a non-zero power CSI-RS in a first set, unless the RE is a specific RE, where the specific RE includes an RE that is among the REs corresponding to the non-zero power CSI-RS in the first set and overlaps an RE corresponding to a zero power CSI-RS; and a receiving unit, configured to receive, on the RE to which data is mapped and that is determined by the resource determining unit, data transmitted by a base station.

According to the data transmission method, the base station, and the UE that are provided by the embodiments of the present invention, when a base station transmits data to a UE, an RE corresponding to some CSI-RS resources in a first set of the UE is used for mapping data. Therefore, the number of REs used for mapping and transmitting data is increased, thereby effectively improving the spectrum efficiency of data transmission.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a flowchart of a data transmission method according to an embodiment of the present invention;

FIG. 2 is a flowchart of a data transmission method according to an embodiment of the present invention;

FIG. 3 is a structural block diagram of a base station according to an embodiment of the present invention;

DETAILED DESCRIPTION

Figure 4:
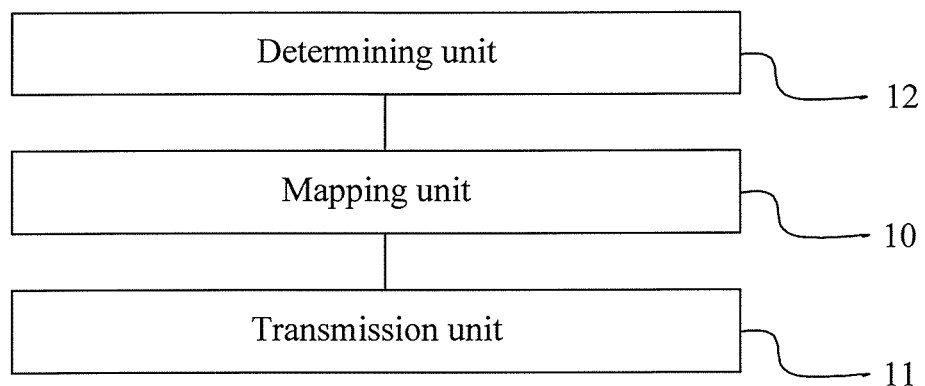
FIG. 4 is a structural block diagram of a base station according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

As shown in FIG. 1, to effectively improve spectrum efficiency of data transmission, a data transmission method provided by an embodiment of the present invention includes the following steps:

Step 101: A base station maps, to an RE according to a preset rule, data that needs to be transmitted to a UE.

It should be noted that, in the data transmission method provided by the embodiment of the present invention, the data that needs to be transmitted to the UE preferably is a physical downlink shared channel PDSCH (Physical Downlink Shared Channel) of the UE. Certainly, it may be understood that, the data transmission method provided by the embodiment of the present invention may also be used for transmitting other data, which is not limited in the present invention.

In this step, the preset rule includes:

mapping data to an RE corresponding to a non-zero power channel state information reference signal CSI-RS in a first set of the UE, unless the RE is a specific RE, where the specific RE includes an RE that is among the REs corresponding to the non-zero power CSI-RS in the first set and overlaps (overlap) an RE corresponding to a zero power CSI-RS.

The overlapping herein refers to that the RE not only is an RE corresponding to the non-zero power CSI-RS, but also is an RE corresponding to the zero power CSI-RS.

It should be noted that, the foregoing rule specifies whether data is mapped to an RE corresponding to the CSI-RS of the UE. However, it may be understood that, in the embodiment of the present invention, the data that needs to be transmitted to the UE by the base station not only needs to be mapped to the RE corresponding to the CSI-RS, but also needs to be mapped to other REs used for mapping and transmitting data. Data mapping to and data transmission on these other REs are not limited in the embodiment of the present invention, that is, the preset rule in this step may further include any other rules used for specifying data mapping to and data transmission on the other REs.

Optionally, in an embodiment of the present invention, in this step, the preset rule includes:

skipping mapping data to an RE corresponding to a non-zero power CSI-RS in a second set of the UE; and mapping data to an RE corresponding to a non-zero power channel state information reference signal CSI-RS in a first set of the UE, unless the RE is a specific RE, where the specific RE includes an RE that is among the REs corresponding to the non-zero power CSI-RS in the first set and overlaps an RE corresponding to a zero power CSI-RS, and an RE that is among the REs corresponding to the non-zero power CSI-RS in the first set and overlaps the RE corresponding to the non-zero power CSI-RS in the second set.

Under a specification in the preset rule, REs corresponding to some non-zero power CSI-RSs in the first set of the UE are used for mapping data; therefore, the number of REs used for mapping and transmitting data is increased, thereby effectively improving the spectrum efficiency of data transmission.

Optionally, in another embodiment of the present invention, in this step, the preset rule includes:

mapping data to an RE corresponding to a non-zero power channel state information reference signal CSI-RS in a first set of the UE, unless the RE is a specific RE, where the specific RE includes an RE that is among the REs corresponding to the non-zero power CSI-RS in the first set and overlaps an RE corresponding to a zero power CSI-RS; and mapping data to an RE corresponding to a non-zero power CSI-RS in a second set of the UE, unless the RE is an RE that overlaps the RE corresponding to the zero power CSI-RS.

Under a specification in the preset rule, REs corresponding to some non-zero power CSI-RSs in the first set of the UE are used for mapping data, and REs corresponding to some non-zero power CSI-RSs in the second set of the UE are used for mapping data; therefore, the number of REs used for mapping and transmitting data is increased, thereby effectively improving the spectrum efficiency of data transmission.

It should be noted that, in the embodiments of the present invention, the first set and the second set are configured on a network side and are notified to the UE by the base station, and each set may include one or more non-zero power CSI-RS resources, used for measurement of RSRP, CSI, and the like. A configuration of the first set and a configuration of the second set are independent from each other. That is, a non-zero power CSI-RS may be in one set and not in the other set, or the two sets are not in an inclusion relationship but may have some overlapping, which means that some CSI-RS resources belong to the first set and the second set at the same time. In the embodiment of the present invention, there is no limitation on the kind of the first set and that of the second set, and they may be any set satisfying the foregoing conditions. The first set may be a set of non-zero power CSI-RS resources used by the UE to measure CSI-RS RSRP and/or RSRQ, and the second set may be a set of non-zero power CSI-RS resources used by the UE to measure CSI and/or a channel quality indicator CQI (Channel Quality Indicator). The first set may also be a set of non-zero power CSI-RS resources used by the UE to measure and feed back CSI-RS RSRP and/or RSRQ, and the second set may also be a set of non-zero power CSI-RS resources used by the UE to measure and feed back CSI and/or a CQI.

Specifically, the first set may be a coordinated multi-point CoMP (Coordinated Multi-Point) resource management set (Resource Management Set), and the second set may be a CoMP measurement set (CoMP Measurement Set).

In the LTE Rel 11, a coordinated multi-point CoMP technology is introduced, and multiple nodes provide data services for one or more UEs at the same time according to coordination between the multiple nodes. When performing CoMP processing, abase station needs to perform scheduling processing according to channel state information between the UE and multiple access nodes and/or channel state information between the UE and an access node set, to allocate a time-frequency resource, a transmission manner, and the like to the UE.

The base station may notify the UE of one or more non-zero power CSI-RSs used for various types of measurement, and may further notify the UE of one or more zero power CSI-RSs used for various types of measurement. A CoMP resource management set and a CoMP measurement set may be defined for each UE, and each set may include one or more non-zero power CSI-RS resources. A CSI-RS resource in the CoMP resource management set is configured for the UE to measure CSI-RS RSRP and the like, and a CSI-RS resource in the CoMP measurement set is configured for the UE to measure CSI and the like. Both the two sets are notified to the UE by the base station. Configurations of the two sets are independent from each other. That is, a non-zero power CSI-RS may be in one set and not in the other set, or the two sets are not in an inclusion relationship but may have some overlapping, which means that some CSI-RS resources belong to the CoMP resource management set and the CoMP measurement set at the same time. Alternatively, an intersection exists between REs corresponding to the CSI-RS resources included in the two sets, which means that some REs or one RE may correspond to one CSI-RS resource in the CoMP resource management set and one CSI-RS resource in the CoMP measurement set at the same time. The number of ports of a CSI-RS resource in the CoMP resource management set and the number of ports of a CSI-RS resource in the CoMP measurement set are also configured independently. For example, one RE may correspond to a two-port CSI-RS resource in the CoMP resource management set and a four-port CSI-RS resource in the CoMP measurement set at the same time.

The following uses an example in which the first set is the CoMP resource management set and the second set is the CoMP measurement set for description.

Optionally, in an embodiment of the present invention, the preset rule includes:

rule 1: map data to an RE corresponding to a non-zero power CSI-RS in the CoMP resource management set of the UE, unless the following cases exist:

(1) if the RE corresponding to the non-zero power CSI-RS is also an RE corresponding to a zero power CSI-RS, that is, the RE corresponding to the non-zero power CSI-RS is an RE that overlaps the RE corresponding to the zero power CSI-RS, the RE cannot be used for mapping and transmitting data; and (2) if the RE corresponding to the non-zero power CSI-RS is also an RE corresponding to a non-zero power CSI-RS in the CoMP measurement set of the UE, that is, the RE corresponding to the non-zero power CSI-RS overlaps the RE corresponding to the non-zero power CSI-RS in the CoMP measurement set, the RE cannot be used for mapping and transmitting data; and rule 2: skip mapping data to an RE corresponding to a non-zero power CSI-RS in the CoMP measurement set of the UE.

For example, it is assumed that, for the UE, an access point AP1 (Access Point) transmits a non-zero power CSI-RS resource 1, and an AP2 transmits a non-zero power CSI-RS resource 2; the base station notifies the UE that the CoMP resource management set of the UE includes the CSI-RS resource 1 and the CSI-RS resource 2 and the CoMP measurement set of the UE includes the CSI-RS resource 2; and the base station may further notify the UE of one or more zero power CSI-RSs at the same time.

In this case, in this step, the CSI-RS resource 2 is included in the CoMP measurement set, and therefore all REs of the CSI-RS resource 2 are not used for mapping and transmitting data according to the rule 2; while the CSI-RS resource 1 is included in the CoMP resource management set but is not included in the CoMP measurement set, and therefore all REs of the CSI-RS resource 1 are used for mapping and transmitting data according to the rule 1. However, if any RE of the CSI-RS resource 1 is also an RE corresponding to any zero power CSI-RS that is notified by the base station, the RE is not used for mapping and transmitting data. In this step, the base station maps, according to the rule 1 and rule 2, data to the REs corresponding to the CSI-RS resource 1, but skips mapping data to an RE that is among the REs corresponding to the CSI-RS resource 1 and overlaps the RE corresponding to the zero power CSI-RS.

Optionally, in another embodiment of the present invention, the preset rule includes:

rule 1': map data to an RE corresponding to a non-zero power CSI-RS in the CoMP resource management set of the UE, unless the following case exists:

if the RE corresponding to the non-zero power CSI-RS is also an RE corresponding to a zero power CSI-RS, that is, the RE corresponding to the non-zero power CSI-RS is an RE that overlaps the RE corresponding to the zero power CSI-RS, the RE cannot be used for mapping and transmitting data; and rule 2': map data to an RE corresponding to a non-zero power CSI-RS in the CoMP measurement set of the UE, unless the following case exists:

if the RE corresponding to the non-zero power CSI-RS is also an RE corresponding to a zero power CSI-RS, that is, the RE corresponding to the non-zero power CSI-RS is an RE that overlaps the RE corresponding to the zero power CSI-RS, the RE cannot be used for mapping and transmitting data.

Similarly, using the foregoing CSI-RS resource 1 and CSI-RS resource 2 as an example, in this case, in this step, according to the rule 1' and rule 2', all REs corresponding to the CSI-RS resource 1 and the CSI-RS resource 2 are used for mapping and transmitting data; however, if any one of the REs corresponding to the CSI-RS resource 1 and the CSI-RS resource 2 is also an RE corresponding to any zero power CSI-RS that is notified by the base station, the RE is not used for mapping and transmitting data.

Step 102: The base station transmits the mapped data to the UE.

It should be noted that, the preset rules are commonly known to the base station and the UE; and according to these preset rules, the UE can determine REs, among REs corresponding to CSI-RS resources allocated by the base station to the UE, which are used for mapping data, receive, on these REs, the data sent to the UE by the base station, and perform data processing.

According to the data transmission method provided by the embodiment of the present invention, when a base station transmits data to a UE, REs corresponding to some CSI-RS resources of the UE are used for mapping data. Therefore, the number of REs used for mapping and transmitting data is increased, thereby effectively improving the spectrum efficiency of data transmission.

Further, to improve flexibility of selecting a resource used for mapping data, in another embodiment of the present invention, before step 101, the method further includes the following step:

determining, by the base station, an RE to which data to be transmitted to the UE is mapped and/or an RE to which data to be transmitted to the UE is not mapped.

Although the preset rules have specified REs, among the REs corresponding to the CSI-RS resources of the UE, which are used for mapping data, and REs that are not used for mapping data, in this embodiment, particularly, the base station may further determine, by itself according to actual situations such as a data transmission requirement, REs that are used for mapping the data to be transmitted to the UE, or determine REs that are not used for mapping the data to be transmitted to the UE, or determine both REs that are used for mapping the data to be transmitted to the UE and REs that are not used for mapping the data to be transmitted to the UE, thereby improving the flexibility of selecting a resource used for mapping data.

In this case, step 101 specifically includes:

mapping, by the base station, to the REs according to the preset rule and the determined RE to which data is mapped and/or the determined RE to which data is not mapped, the data that needs to be transmitted to the UE.

Before step 102, the method further includes:

sending, by the base station, RE notification information to the UE, where the RE notification information is used for notifying the UE of the determined RE to which data is mapped and/or the determined RE to which data is not mapped, so that the UE can determine, according to the preset rule and notification of the RE notification information, an RE to which the base station maps data, and receive data on these REs.

Specifically, the RE notification information may be semi-static signaling or dynamic signaling, such as downlink control information DCI (Downlink Control Information), or radio resource control RRC (Radio Resource Control) signaling, and certainly may further be other semi-static signaling or dynamic signaling. The signaling herein includes physical layer signaling or higher layer signaling, which is not limited in the present invention.

For example, an RE to which data is mapped and/or an RE to which data is not mapped when a PDSCH corresponding to the DCI is transmitted may be indicated in the DCI. During the indication, the indication may be performed by using an index number or bitmap mapping, where each index number corresponds to one group of REs to which data is mapped and/or REs to which data is not mapped, and each bit in the bitmap mapping corresponds to one group (such as one CSI-RS resource) of REs to which data is mapped and/or REs to which data is not mapped. A definition corresponding to each index number or bitmap mapping state may be notified in a semi-static manner by using the RRC. For a meaning corresponding to a specific index number or bitmap mapping state, reference may be made to Table 1 and Table 2 respectively.

TABLE 1

| Index number | Indicated meaning |
| --- | --- |
| 0 | An RE corresponding to a non-zero power CSI-RS resource 1 is used for mapping data. |
| 1 | REs corresponding to the first two ports of a non-zero power CSI-RS resource 1 are used for mapping data. |
| 2 | REs corresponding to a non-zero power CSI-RS resource 1 and a non-zero power CSI-RS resource 3 and a non-zero power CSI-RS resource 5 are not used for mapping data. |
| 3 | REs corresponding to a non-zero power CSI-RS resource 3 and a non-zero power CSI-RS resource 5 are not used for mapping data, and REs corresponding to the first two ports of a non-zero power CSI-RS resource 1 are used for mapping data. |
| 4 | An RE corresponding to a non-zero power CSI-RS resource 1 is not used for mapping data. |
| 5 | REs corresponding to the first two ports of a non-zero power CSI-RS resource 1 are not used for mapping data. |
| 6 | REs corresponding to a non-zero power CSI-RS resource 1 and a non-zero power CSI-RS resource 3 and a non-zero power CSI-RS resource 5 are used for mapping data. |
| 7 | REs corresponding to a non-zero power CSI-RS resource 3 and a non-zero power CSI-RS resource 5 are used for mapping data, and REs corresponding to the first two ports of a non-zero power CSI-RS resource 1 are not used for mapping data. |

TABLE 2

| Bitmap mapping | Indicated meaning |
| --- | --- |
| 100 | An RE corresponding to a non-zero power CSI-RS resource 1 is used for mapping data. |
| 000 | REs corresponding to a non-zero power CSI-RS resource 1 and a non-zero power CSI-RS resource 3 and a non-zero power CSI-RS resource 5 are not used for mapping data. |
| 110 | An RE corresponding to a non-zero power CSI-RS resource 5 is not used for mapping data, and REs corresponding to a non-zero power CSI-RS resource 1 and a non-zero power CSI-RS resource 3 is used for mapping data. |
| 111 | REs corresponding to a non-zero power CSI-RS resource 1 and a non-zero power CSI-RS resource 3 and a non-zero power CSI-RS resource 5 are used for mapping data. |

It should be noted that, the RE to which data to be transmitted to the UE is mapped and/or the RE to which data to be transmitted to the UE is not mapped that is determined by the base station may be contrary to a specification in the preset rule. That is, the preset rule specifies that data is mapped to an RE, but the base station determines that data is not mapped to the RE; or the preset rule specifies that data is not mapped to an RE, but the base station determines that data is mapped to the RE. For this case, optionally, in an embodiment of the present invention, when the base station maps data, if the RE to which data to be transmitted to the UE is mapped and/or the RE to which data to be transmitted to the UE is not mapped that is determined by the base station is contrary to the specification in the preset rule, the determining of the base station prevails. However, for the UE, the RE to which data is mapped and/or the RE to which data is not mapped that is notified by using the RE notification information of the base station is not limited by the preset rule. That is, for the UE, when there is no RE notification information, whether data is mapped to an RE is subject to the specification in the preset rule; however, if there is RE notification information, whether data is mapped to an RE that is notified by using the RE notification information is subject to the RE notification information, and whether data is mapped to other REs is subject to the specification in the preset rule.

Optionally, in an embodiment of the present invention, the base station determines an RE to which data to be transmitted to the UE is mapped, and notifies, by using the RE notification information, the UE of the determined RE to which data is mapped. In this case, the mapping, by the base station, to the REs according to the preset rule and the determined RE to which data is mapped and/or the determined RE to which data is not mapped, the data that needs to be transmitted to the UE in step 101 specifically includes:

if an RE is the determined RE to which data is mapped, mapping data to the RE; and if an RE is not included in the determined RE to which data is mapped, mapping or skipping mapping data to the RE according to the preset rule.

That is, if an RE is the RE to which data is mapped and that is determined by the base station, but the preset rule specifies that data is not mapped to the RE, in this case, when the base station maps data, the determining of the base station prevails, and data is mapped to the RE. However, if an RE is not included in the RE to which data is mapped and that is determined by the base station, the base station conforms to the specification in the preset rule. If the preset rule specifies that data is mapped to the RE, the base station maps data to the RE; and if the preset rule specifies that data is not mapped to the RE, the base station skips mapping data to the RE.

Optionally, in another embodiment of the present invention, the base station determines an RE to which data to be transmitted to the UE is not mapped, and notifies, by using the RE notification information, the UE of the determined RE to which data is not mapped. In this case, the mapping, by the base station, to the REs according to the preset rule and the determined RE to which data is mapped and/or the determined RE to which data is not mapped, the data that needs to be transmitted to the UE in step 101 specifically includes:

if an RE is the determined RE to which data is not mapped, skipping mapping data to the RE; and if an RE is not included in the determined RE to which data is not mapped, mapping or skipping mapping data to the RE according to the, preset rule.

That is, if an RE is the RE to which data is not mapped that is determined by the base station, but the preset rule specifies that data is mapped to the RE, in this case, when the base station maps data, the determining of the base station prevails, and data is not mapped to the RE. However, if an RE is not included in the RE to which data is not mapped that is determined by the base station, the base station conforms to the specification in the preset rule. If the preset rule specifies that data is mapped to the RE, the base station maps data to the RE; and if the preset rule specifies that data is not mapped to the RE, the base station skips mapping data to the RE.

Optionally, in another embodiment of the present invention, the base station determines an RE to which data to be transmitted to the UE is mapped and an RE to which data to be transmitted to the UE is not mapped, and notifies, by using the RE notification information, the UE of the determined RE to which data is mapped and the determined RE to which data is not mapped. In this case, the mapping, by the base station, to the REs according to the preset rule and the determined RE to which data is mapped and/or the determined RE to which data is not mapped, the data that needs to be transmitted to the UE in step 101 specifically includes:

if an RE is the determined RE to which data is not mapped, skipping mapping data to the RE;

if an RE is the determined RE to which data is mapped, mapping data to the RE; and if an RE is not included in the RE to which data is mapped and the RE to which data is not mapped that are determined by the base station, mapping or skipping mapping data to the RE according to the preset rule.

That is, if an RE is the RE to which data is not mapped that is determined by the base station, but the preset rule specifies that data is mapped to the RE, in this case, when the base station maps data, the determining of the base station prevails, and data is not mapped to the RE. If an RE is the RE to which data is mapped and that is determined by the base station, but the preset rule specifies that data is not mapped to the RE, in this case, when the base station maps data, the determining of the base station prevails, and data is mapped to the RE. However, if an RE is not included in the RE to which data is mapped and the RE to which data is not mapped that are determined by the base station, the base station conforms to the specification in the preset rule. If the preset rule specifies that data is mapped to the RE, the base station maps data to the RE; and if the preset rule specifies that data is not mapped to the RE, the base station skips mapping data to the RE.

For example, in an embodiment of the present invention, if the preset rule includes the foregoing rule 1 and rule 2; the CoMP resource management set of the UE includes a CSI-RS resource 1, a CSI-RS resource 2, and a CSI-RS resource 3, and the CoMP measurement set includes the CSI-RS resource 2 and the CSI-RS resource 3; and the base station determines that data is mapped to REs corresponding to the CSI-RS resource 3 and notifies the UE by using the RE notification information. The base station may notify the UE of one or more zero power CSI-RSs at the same time, then:

the CoMP measurement set of the UE includes the CSI-RS resource 2, and the base station does not determine that data is mapped to REs corresponding to the CSI-RS resource 2; therefore, in step 101, data is not mapped to all the REs corresponding to the CSI-RS resource 2 according to the preset rule; and the CoMP measurement set of the UE includes the CSI-RS resource 3, and data is not mapped to the REs corresponding to the CSI-RS resource 3 according to the preset rule, but the base station determines that data is mapped to the REs corresponding to the CSI-RS resource 3; therefore, in step 101, data is mapped to all the REs corresponding to the CSI-RS resource 3.

The CoMP resource management set of the UE includes the CSI-RS resource 1, and the CSI-RS resource 1 is not included in the CoMP measurement set; therefore, in step 101, all REs corresponding to the CSI-RS resource 1 are used for mapping and transmitting data according to the preset rule; however, if any one of the REs corresponding to the CSI-RS resource 1 is also an RE that overlaps the RE corresponding to the zero power CSI-RS, the RE is not used for mapping and transmitting data.

For the UE, it is determined, according to the RE notification information of the base station, the rule 1 and the rule 2, that the base station skips mapping data to all the REs corresponding to the CSI-RS resource 2, maps data to all the REs corresponding to the CSI-RS resource 3, and maps data to and transmits data on all the REs corresponding to the CSI-RS resource 1; however, if any one of the REs corresponding to the CSI-RS resource 1 is also an RE that overlaps the RE corresponding to the zero power CSI-RS, the RE is not used for mapping and transmitting data.

In addition, for a case in which the RE to which data to be transmitted to the UE is mapped and/or the RE to which data to be transmitted to the UE is not mapped that is determined by the base station is contrary to the specification in the preset rule, in an embodiment of the present invention, data is not mapped to the RE corresponding to the zero power CSI-RS. Then, if the RE to which data can be mapped that is determined by the base station is the RE corresponding to the zero power CSI-RS, data is not mapped to the RE.

That is, if the RE to which data to be transmitted to the UE is mapped and/or the RE to which data to be transmitted to the UE is not mapped that is determined by the base station is contrary to the specification in the preset rule, for the RE corresponding to the zero power CSI-RS, data is not mapped to the RE, not matter whether the RE is the RE to which data is mapped and that is determined by the base station; for an RE which is not the RE corresponding to the zero power CSI-RS but is the RE to which data is mapped and/or the RE to which data is not mapped that is determined by the base station, the determining of the base station prevails; if an RE is neither the RE corresponding to the zero power CSI-RS nor the RE to which data is mapped and/or the RE to which data is not mapped that is determined by the base station, the preset rule prevails. The same can be said for the UE: for the RE corresponding to the zero power CSI-RS, no matter whether the RE is the RE to which data is mapped and that is determined by the base station, it is determined that data is not mapped to the RE; however, another RE that is not the RE corresponding to the zero power CSI-RS is not limited by the preset rule, and notification of the base station prevails. That is, for the UE, when there is no RE notification information, whether data is mapped to an RE is subject to the specification in the preset rule; however, if there is RE notification information: 1) for the RE corresponding to the zero power CSI-RS, no matter whether the RE is the RE to which data is mapped and that is determined by the base station, it is determined that data is not mapped to the RE; 2) for an RE that is not the RE corresponding to the zero power CSI-RS, it is subject to whether data is mapped to the RE, which is notified by using the RE notification information, thereby determining whether data is mapped to the corresponding RE; and 3) for an RE that is not the RE corresponding to the zero power CSI-RS, and is not included in the RE to which data is mapped and/or the RE to which data is not mapped that is notified by the base station, the specification in the preset rule prevails.

Optionally, in another embodiment of the present invention, the mapping, by the base station, to the REs according to the preset rule and the determined RE to which data is mapped and/or the determined RE to which data is not mapped, the data that needs to be transmitted to the UE in step 101 specifically includes:

if the preset rule specifies that data is mapped to an RE, but the RE is the determined RE to which data is not mapped, skipping mapping data to the RE;

if the preset rule specifies that data is not mapped to an RE, but the RE is the determined RE to which data is mapped, and the RE is the RE corresponding to the zero power CSI-RS, skipping mapping data to the RE; and if the preset rule specifies that data is not mapped to an RE, but the RE is the determined RE to which data is mapped, and the RE is not the RE corresponding to the zero power CSI-RS, mapping data to the RE.

Optionally, in an embodiment of the present invention, the base station determines an RE to which data to be transmitted to the UE is mapped, and notifies, by using the RE notification information, the UE of the determined RE to which data is mapped. In this case, the mapping, by the base station, to the REs according to the preset rule and the determined RE to which data is mapped and/or the determined RE to which data is not mapped, the data that needs to be transmitted to the UE in step 101 specifically includes:

if an RE is the RE corresponding to the zero power CSI-RS, skipping mapping data to the RE;

if an RE is not the RE corresponding to the zero power CSI-RS, and the RE is the determined RE to which data is mapped, mapping data to the RE; and if an RE is not the RE corresponding to the zero power CSI-RS, and the RE is not included in the determined RE to which data is mapped, mapping or skipping mapping data to the RE according to the preset rule.

Optionally, in another embodiment of the present invention, the base station determines an RE to which data to be transmitted to the UE is not mapped, and notifies, by using the RE notification information, the UE of the determined RE to which data is not mapped. In this case, the mapping, by the base station, to the REs according to the preset rule and the determined RE to which data is mapped and/or the determined RE to which data is not mapped, the data that needs to be transmitted to the UE in step 101 specifically includes:

if an RE is the RE corresponding to the zero power CSI-RS, skipping mapping data to the RE;

if an RE is not the RE corresponding to the zero power CSI-RS, and the RE is the determined RE to which data is not mapped, skipping mapping data to the RE; and if an RE is not the RE corresponding to the zero power CSI-RS, and the RE is not included in the determined RE to which data is not mapped, mapping or skipping mapping data to the RE according to a specification in the preset rule.

Specifically, in another embodiment of the present invention, the base station determines an RE to which data to be transmitted to the UE is mapped and an RE to which data to be transmitted to the UE is not mapped, and notifies, by using the RE notification information, the UE of the determined RE to which data is mapped and the determined RE to which data is not mapped. In this case, the mapping, by the base station, to the REs according to the preset rule and the determined RE to which data is mapped and/or the determined RE to which data is not mapped, the data that needs to be transmitted to the UE in step 101 specifically includes:

if an RE is the RE corresponding to the zero power CSI-RS, skipping mapping data to the RE;

if an RE is not the RE corresponding to the zero power CSI-RS, and the RE is the determined RE to which data is not mapped, skipping mapping data to the RE;

if an RE is not the RE corresponding to the zero power CSI-RS, and the RE is the determined RE to which data is mapped, mapping data to the RE; and if an RE is not the RE corresponding to the zero power CSI-RS, and the RE is not included in the determined RE to which data is mapped and the determined RE to which data is not mapped, mapping or skipping mapping data to the RE according to a specification in the preset rule.

It should be noted that, overlapping of REs in the embodiments of the present invention may be that all or some REs in one CSI-RS resource overlap all or some REs in another CSI-RS resource.

It should be noted that, in the present invention, the non-zero power CSI-RS may be a non-zero power CSI-RS resource, and the zero power CSI-RS may be a zero power CSI-RS resource.

Based on the foregoing description of the technical solutions in the embodiments of the present invention, specifically, in an embodiment of the present invention, the preset rule includes the foregoing rule 1 and rule 2, and the base station further determines the RE to which data to be transmitted to the UE is mapped and/or the RE to which data to be transmitted to the UE is not mapped, and notifies the UE by using the RE notification information. In this case, in step 101, the base station may map, to the RE in one of the following manners, the data that needs to be transmitted to a user:

Manner 1:

Map data to the RE corresponding to the non-zero power CSI-RS in the CoMP resource management set of the UE, unless:

(1) the RE is the RE to which data is not mapped that is determined by the base station;

(2) the RE is an RE that overlaps the RE corresponding to the zero power CSI-RS, and the RE is not included in the RE to which data is mapped and that is determined by the base station; or (3) the RE is an RE that overlaps an RE corresponding to a CSI-RS in the CoMP measurement set of the UE, and the RE is not included in the RE to which data is mapped and that is determined by the base station.

Skip mapping data to the RE corresponding to the non-zero power CSI-RS in the CoMP measurement set of the UE, unless the RE is the RE to which data is mapped and that is determined by the base station.

Manner 2:

Map data to the RE corresponding to the non-zero power CSI-RS in the CoMP resource management set of the UE, unless:

(1) the RE is an RE that overlaps the RE corresponding to the zero power CSI-RS, and the RE is not included in the RE to which data is mapped and that is determined by the base station; or (2) the RE is an RE that overlaps an RE corresponding to a CSI-RS in the CoMP measurement set of the UE, and the RE is not included in the RE to which data is mapped and that is determined by the base station.

Skip mapping data to the RE corresponding to the non-zero power CSI-RS in the CoMP measurement set of the UE, unless the RE is the RE to which data is mapped and that is determined by the base station.

Manner 3:

Map data to the RE corresponding to the non-zero power CSI-RS in the CoMP resource management set of the UE, unless:

(1) the RE is the RE to which data is not mapped that is determined by the base station;

(2) the RE is an RE that overlaps the RE corresponding to the zero power CSI-RS; or (3) the RE is an RE that overlaps an RE corresponding to a CSI-RS in the CoMP measurement set of the UE.

Skip mapping data to the RE corresponding to the non-zero power CSI-RS in the CoMP measurement set of the UE.

Manner 4:

Map data to the RE corresponding to the non-zero power CSI-RS in the CoMP resource management set of the UE, unless:

(1) the RE is an RE that overlaps the RE corresponding to the zero power CSI-RS;

(2) the RE is the RE to which data is not mapped that is determined by the base station; or (3) the RE is an RE that overlaps an RE corresponding to a CSI-RS in the CoMP measurement set of the UE, and the RE is not included in the RE to which data is mapped and that is determined by the base station.

Skip mapping data to the RE corresponding to the non-zero power CSI-RS in the CoMP measurement set of the UE, unless the RE is the RE to which data is mapped and that is determined by the base station.

Manner 5:

Map data to the RE corresponding to the non-zero power CSI-RS in the CoMP resource management set of the UE, unless:

(1) the RE is an RE that overlaps the RE corresponding to the zero power CSI-RS; or (2) the RE is an RE that overlaps an RE corresponding to a CSI-RS in the CoMP measurement set of the UE, and the RE is not included in the RE to which data is mapped and that is determined by the base station.

Skip mapping data to the RE corresponding to the non-zero power CSI-RS in the CoMP measurement set of the UE, unless the RE is the RE to which data is mapped and that is determined by the base station.

Manner 6:

Map data to the RE corresponding to the non-zero power CSI-RS in the CoMP resource management set of the UE, unless:

(1) the RE is an RE that overlaps the RE corresponding to the zero power CSI-RS;

(2) the RE is the RE to which data is not mapped that is determined by the base station; or (3) the RE is an RE that overlaps an RE corresponding to a CSI-RS in the CoMP measurement set of the UE.

Skip mapping data to the RE corresponding to the non-zero power CSI-RS in the CoMP measurement set of the UE.

Specifically, in another embodiment of the present invention, the preset rule includes the foregoing rule 1' and rule 2', and the base station further determines the RE to which data to be transmitted to the UE is mapped and/or the RE to which data to be transmitted to the UE is not mapped, and notifies the UE by using the RE notification information. In this case, in step 101, the base station may map, to the RE in one of the following manners, the data that needs to be transmitted to a user:

Manner 1:

Map data to the RE corresponding to the non-zero power CSI-RS in the CoMP resource management set of the UE, unless:

(1) the RE is the RE to which data is not mapped that is determined by the base station; or (2) the RE is an RE that overlaps the RE corresponding to the zero power CSI-RS, and the RE is not included in the RE to which data is mapped and that is determined by the base station.

Map data to the RE corresponding to the non-zero power CSI-RS in the CoMP measurement set of the UE, unless:

(1) the RE is the RE to which data is not mapped that is determined by the base station; or (2) the RE is an RE that overlaps the RE corresponding to the zero power CSI-RS, and the RE is not included in the RE to which data is mapped and that is determined by the base station.

Manner 2:

Map data to the RE corresponding to the non-zero power CSI-RS in the CoMP resource management set of the UE, unless:

(1) the RE is an RE that overlaps the RE corresponding to the zero power CSI-RS, and the RE is not included in the RE to which data is mapped and that is determined by the base station.

Map data to the RE corresponding to the non-zero power CSI-RS in the CoMP measurement set of the UE, unless:

(1) the RE is an RE that overlaps the RE corresponding to the zero power CSI-RS, and the RE is not included in the RE to which data is mapped and that is determined by the base station.

Manner 3:

Map data to the RE corresponding to the non-zero power CSI-RS in the CoMP resource management set of the UE, unless:

(1) the RE is the RE to which data is not mapped that is determined by the base station; or (2) the RE is an RE that overlaps the RE corresponding to the zero power CSI-RS.

Map data to the RE corresponding to the non-zero power CSI-RS in the CoMP measurement set of the UE, unless:

(1) the RE is the RE to which data is not mapped that is determined by the base station; or (2) the RE is an RE that overlaps the RE corresponding to the zero power CSI-RS.

Manner 4:

Map data to the RE corresponding to the non-zero power CSI-RS in the CoMP resource management set of the UE, unless:

(1) the RE is an RE that overlaps the RE corresponding to the zero power CSI-RS; or (2) the RE is the RE to which data is not mapped that is determined by the base station.

Map data to the RE corresponding to the non-zero power CSI-RS in the CoMP measurement set of the UE, unless:

(1) the RE is an RE that overlaps the RE corresponding to the zero power CSI-RS; or (2) the RE is the RE to which data is not mapped that is determined by the base station.

Manner 5:

Map data to the RE corresponding to the non-zero power CSI-RS in the CoMP resource management set of the UE, unless:

(1) the RE is an RE that overlaps the RE corresponding to the zero power CSI-RS.

Map data to the RE corresponding to the non-zero power CSI-RS in the CoMP measurement set of the UE, unless:

(1) the RE is an RE that overlaps the RE corresponding to the zero power CSI-RS.

Corresponding to the foregoing method embodiment, an embodiment of the present invention further provides a data transmission method. As shown in FIG. 2, the method includes the following steps:

Step 201: A UE determines, according to a preset rule, an RE to which data is mapped.

The preset rule includes:

mapping data to an RE corresponding to a non-zero power CSI-RS in a first set of the UE, unless the RE is a specific RE, where the specific RE includes an RE that is among the REs corresponding to the non-zero power CSI-RS in the first set and overlaps an RE corresponding to a zero power CSI-RS.

Optionally, in an embodiment of the present invention, the preset rule includes:

skipping mapping data to an RE corresponding to a non-zero power CSI-RS in a second set of the UE; and mapping data to an RE corresponding to a non-zero power CSI-RS in a first set of the UE, unless the RE is a specific RE, where the specific RE includes an RE that is among the REs corresponding to the non-zero power CSI-RS in the first set and overlaps an RE corresponding to a zero power CSI-RS, and an RE that is among the REs corresponding to the non-zero power CSI-RS in the first set and overlaps the RE corresponding to the non-zero power CSI-RS in the second set.

Optionally, in another embodiment of the present invention, in this step, the preset rule includes:

mapping data to an RE corresponding to a non-zero power CSI-RS in a first set of the UE, unless the RE is a specific RE, where the specific RE includes an RE that is among the REs corresponding to the non-zero power CSI-RS in the first set and overlaps an RE corresponding to a zero power CSI-RS; and mapping data to an RE corresponding to a non-zero power CSI-RS in a second set of the UE, unless the RE is an RE that overlaps the RE corresponding to the zero power CSI-RS.

Specifically, the first set is a CoMP resource management set of the UE, and the second set is a CoMP measurement set of the UE.

Step 202: The UE receives, on the determined RE to which data is mapped, data transmitted by a base station.

According to the data transmission method provided by the embodiment of the present invention, when a base station transmits data to a UE, REs corresponding to some CSI-RS resources of the UE are used for mapping data. Therefore, the number of REs used for mapping and transmitting data is increased, thereby effectively improving the spectrum efficiency of data transmission.

Further, in an embodiment of the present invention, before step 201, the method further includes:

receiving, by the UE, RE notification information sent by the base station, where the RE notification information is used for notifying an RE to which data is mapped and/or an RE to which data is not mapped that is determined by the base station.

In this case, step 201 specifically includes:

determining, according to the preset rule and the RE to which data is mapped and/or the RE to which data is not mapped that is notified by using the RE notification information, the RE to which data is mapped.

It should be noted that, in an embodiment of the present invention, when the RE notification information delivered by the base station is received, whether the RE notified by using the RE notification information can be used for mapping data is subject to the RE notification information and is not limited by the preset rule, and whether data can be mapped to another RE is subject to a specification in the preset rule. That is, if the preset rule specifies that data is mapped to an RE, but the RE notification information notifies that the RE is the determined RE to which data is not mapped, the UE determines that data is not mapped to the RE; and if the preset rule specifies that data is not mapped to an RE, but the RE notification information notifies that the RE is the determined RE to which data is mapped, the UE determines that data is mapped to the RE.

Optionally, when the RE notification information notifies the RE to which data is not mapped, step 201 specifically includes:

if an RE is the RE to which data is not mapped that is notified by using the RE notification information, determining that data is not mapped to the RE; and if an RE is not included in the RE to which data is not mapped that is notified by using the RE notification information, determining, according to the preset rule, whether data is mapped or not mapped to the RE.

Optionally, when the RE notification information notifies the RE to which data is mapped, step 201 specifically includes:

if an RE is the RE to which data is mapped and that is notified by using the RE notification information, determining that data is mapped to the RE; and if an RE is not included in the RE notified by using the RE notification information, determining, according to the preset rule, whether data is mapped or not mapped to the RE.

Optionally, when the RE notification information notifies the RE to which data is mapped and the RE to which data is not mapped, step 201 specifically includes:

if an RE is the RE to which data is not mapped that is notified by using the RE notification information, determining that data is not mapped to the RE;

if an RE is the RE to which data is mapped and that is notified by using the RE notification information, determining that data is mapped to the RE; and if an RE is not included in the RE to which data is mapped and the RE to which data is not mapped that are notified by using the RE notification information, determining, according to the preset rule, whether data is mapped or not mapped to the RE.

In another embodiment of the present invention, the base station skips mapping data to the RE corresponding to the zero power CSI-RS, no matter whether the RE is the RE to which data is mapped and that is notified by using the RE notification information. In this case, optionally, when the RE notification information notifies the RE to which data is not mapped, step 201 is specifically:

if an RE is the RE corresponding to the zero power CSI-RS, determining that data is not mapped to the RE;

if an RE is not the RE corresponding to the zero power CSI-RS, and the RE is the RE to which data is not mapped that is notified by using the RE notification information, determining that data is not mapped to the RE; and if an RE is not the RE corresponding to the zero power CSI-RS, and the RE is not included in the RE to which data is not mapped that is notified by using the RE notification information, determining, according to the preset rule, whether data is mapped or not mapped to the RE.

Optionally, when the RE notification information notifies the RE to which data is mapped, step 201 is specifically:

if an RE is the RE corresponding to the zero power CSI-RS, determining that data is not mapped to the RE;

if an RE is not the RE corresponding to the zero power CSI-RS, and the RE is the RE to which data is mapped and that is notified by using the RE notification information, determining that data is mapped to the RE; and if an RE is not the RE corresponding to the zero power CSI-RS, and the RE is not included in the RE to which data is mapped and that is notified by using the RE notification information, determining, according to the preset rule, whether data is mapped or not mapped to the RE.

Optionally, when the RE notification information notifies the RE to which data is mapped and the RE to which data is not mapped, step 201 is specifically:

if an RE is the RE corresponding to the zero power CSI-RS, determining that data is not mapped to the RE;

if an RE is not the RE corresponding to the zero power CSI-RS, and the RE is the RE to which data is not mapped that is notified by using the RE notification information, determining that data is not mapped to the RE;

if an RE is not the RE corresponding to the zero power CSI-RS, and the RE is the RE to which data is mapped and that is notified by using the RE notification information, determining that data is mapped to the RE; and if an RE is not the RE corresponding to the zero power CSI-RS, and the RE is not included in the REs notified by using the RE notification information, determining, according to the preset rule, whether data is mapped or not mapped to the RE.

Corresponding to the foregoing method embodiments, an embodiment of the present invention further provides a base station. As shown in FIG. 3, the base station includes:

a mapping unit 10, configured to map, to an RE according to a preset rule, data that needs to be transmitted to a UE, where the preset rule includes:

mapping data to an RE corresponding to a non-zero power CSI-RS in a first set of the UE, unless the RE is a specific RE, where the specific RE includes an RE that is among the REs corresponding to the non-zero power CSI-RS in the first set and overlaps an RE corresponding to a zero power CSI-RS; and a transmission unit 11, configured to transmit, to the UE, the data mapped by the mapping unit 10.

According to the base station provided by the embodiment of the present invention, when data is transmitted to a UE, REs corresponding to some CSI-RS resources of the UE are used for mapping data. Therefore, the number of REs used for mapping and transmitting data is increased, thereby effectively improving the spectrum efficiency of data transmission.

Optionally, in an embodiment of the present invention, the preset rule includes:

skipping mapping data to an RE corresponding to a non-zero power CSI-RS in a second set of the UE; and mapping data to an RE corresponding to a non-zero power CSI-RS in a first set of the UE, unless the RE is a specific RE, where the specific RE includes an RE that is among the REs corresponding to the non-zero power CSI-RS in the first set and overlaps an RE corresponding to a zero power CSI-RS, and an RE that is among the REs corresponding to the non-zero power CSI-RS in the first set and overlaps the RE corresponding to the non-zero power CSI-RS in the second set.

Under a specification in the preset rule, REs corresponding to some non-zero power CSI-RSs in the first set of the UE are used for mapping data; therefore, the number of REs used for mapping and transmitting data is increased, thereby effectively improving the spectrum efficiency of data transmission.

Optionally, in another embodiment of the present invention, the preset rule includes:

mapping data to an RE corresponding to a non-zero power channel state information reference signal CSI-RS in a first set of the UE, unless the RE is a specific RE, where the specific RE includes an RE that is among the REs corresponding to the non-zero power CSI-RS in the first set and overlaps an RE corresponding to a zero power CSI-RS; and mapping data to an RE corresponding to a non-zero power CSI-RS in a second set of the UE, unless the RE is an RE that overlaps the RE corresponding to the zero power CSI-RS.

Under a specification in the preset rule, REs corresponding to some non-zero power CSI-RSs in the first set of the UE are used for mapping data, and REs corresponding to some non-zero power CSI-RSs in the second set of the UE are used for mapping data; therefore, the number of REs used for mapping and transmitting data is increased, thereby effectively improving the spectrum efficiency of data transmission.

Specifically, the first set is a coordinated multi-point CoMP resource management set, and the second set is a coordinated multi-point CoMP measurement set.

Further, in an embodiment of the present invention, as shown in FIG. 4, the base station further includes a determining unit 12, configured to determine an RE to which data to be transmitted to the UE is mapped and/or an RE to which data to be transmitted to the UE is not mapped, where in this case, the mapping unit 10 is specifically configured to map, to the RE according to the preset rule and the RE to which data is mapped and/or the RE to which data is not mapped that is determined by the determining unit 12, the data that needs to be transmitted to the UE; and the transmission unit 11 is further configured to send RE notification information to the UE, where the RE notification information is used for notifying the UE of the RE to which data is mapped and/or the RE to which data is not mapped that is determined by the determining unit.

Optionally, in an embodiment of the present invention:

the determining unit 12 is specifically configured to determine an RE to which data is not mapped;

the transmission unit 11 is specifically configured to send RE notification information to the UE, where the RE notification information is used for notifying the UE of the RE to which data is not mapped that is determined by the determining unit 12; and the mapping unit 10 is specifically configured to:

if an RE is the RE to which data is not mapped that is determined by the determining unit 12, skip mapping data to the RE; and if an RE is not included in the RE to which data is not mapped that is determined by the determining unit 12, map or skip mapping data to the RE according to the preset rule.

Optionally, in an embodiment of the present invention:

the determining unit 12 is specifically configured to determine an RE to which data is mapped;

the transmission unit 11 is specifically configured to send RE notification information to the UE, where the RE notification information is used for notifying the UE of the RE to which data is mapped and that is determined by the determining unit 12; and the mapping unit 10 is specifically configured to:

if an RE is the RE to which data is mapped and that is determined by the determining unit 12, map data to the RE; and if an RE is not included in the RE to which data is mapped and that is determined by the determining unit 12, map or skip mapping data to the RE according to the preset rule.

Optionally, in an embodiment of the present invention:

the determining unit 12 is specifically configured to determine an RE to which data is mapped and an RE to which data is not mapped;

the transmission unit 11 is specifically configured to send RE notification information to the UE, where the RE notification information is used for notifying the UE of the RE to which data is mapped and the RE to which data is not mapped that are determined by the determining unit 12; and the mapping unit 10 is specifically configured to:

if an RE is the RE to which data is not mapped that is determined by the determining unit 12, skip mapping data to the RE;

if an RE is the RE to which data is mapped and that is determined by the determining unit 12, map data to the RE; and if an RE is not included in the RE to which data is mapped and the RE to which data is not mapped that are determined by the determining unit 12, map or skip mapping data to the RE according to the preset rule.

Optionally, in an embodiment of the present invention:

the determining unit 12 is specifically configured to determine an RE to which data is not mapped;

the transmission unit 11 is specifically configured to send RE notification information to the UE, where the RE notification information is used for notifying the UE of the RE to which data is not mapped that is determined by the determining unit 12; and the mapping unit 10 is specifically configured to:

if an RE is the RE corresponding to the zero power CSI-RS, skip mapping data to the RE;

if an RE is not the RE corresponding to the zero power CSI-RS, and the RE is the RE to which data is not mapped that is determined by the determining unit 12, skip mapping data to the RE; and if an RE is not the RE corresponding to the zero power CSI-RS, and the RE is not included in the RE to which data is not mapped that is determined by the determining unit 12, map or skip mapping data to the RE according to a specification in the preset rule.

Optionally, in an embodiment of the present invention:

the determining unit 12 is specifically configured to determine an RE to which data is mapped;

the transmission unit 11 is specifically configured to send RE notification information to the UE, where the RE notification information is used for notifying the UE of the RE to which data is mapped and that is determined by the determining unit 12; and the mapping unit 10 is specifically configured to:

if an RE is the RE corresponding to the zero power CSI-RS, skip mapping data to the RE;

if an RE is not the RE corresponding to the zero power CSI-RS, and the RE is the RE to which data is mapped and that is determined by the determining unit 12, map data to the RE; and if an RE is not the RE corresponding to the zero power CSI-RS, and the RE is not included in the RE to which data is mapped and that is determined by the determining unit 12, map or skip mapping data to the RE according to a specification in the preset rule.

Optionally, in an embodiment of the present invention:

the determining unit 12 is specifically configured to determine an RE to which data is mapped and an RE to which data is not mapped;

the transmission unit 11 is specifically configured to send RE notification information to the UE, where the RE notification information is used for notifying the UE of the RE to which data is mapped and the RE to which data is not mapped that are determined by the determining unit 12; and the mapping unit 10 is specifically configured to:

if an RE is the RE corresponding to the zero power CSI-RS, skip mapping data to the RE;

if an RE is not the RE corresponding to the zero power CSI-RS, and the RE is the RE to which data is mapped and that is determined by the determining unit 12, map data to the RE;

if an RE is not the RE corresponding to the zero power CSI-RS, and the RE is the RE to which data is not mapped that is determined by the determining unit 12, skip mapping data to the RE; and if an RE is not the RE corresponding to the zero power CSI-RS, and the RE is not included in the RE to which data is mapped and the RE to which data is not mapped that are determined by the determining unit 12, map or skip mapping data to the RE according to a specification in the preset rule.

Figure 5:
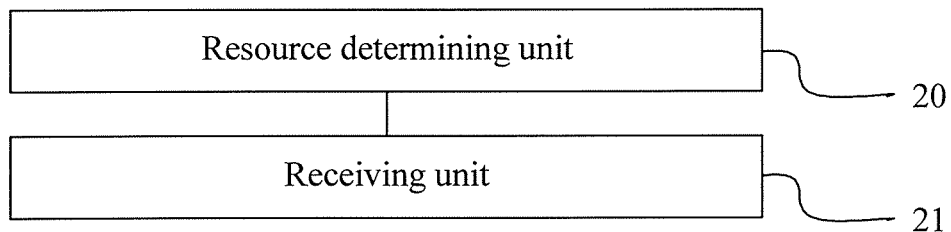
FIG. 5 is a structural block diagram of a UE according to an embodiment of the present invention.

Corresponding to the foregoing method embodiments, an embodiment of the present invention further provides a UE. As shown in FIG. 5, the UE includes:

a resource determining unit 20, configured to determine, according to a preset rule, an RE to which data is mapped, where the preset rule includes: mapping data to an RE corresponding to a non-zero power CSI-RS in a first set of the UE, unless the RE is a specific RE, where the specific RE includes an RE that is among the REs corresponding to the non-zero power CSI-RS in the first set and overlaps an RE corresponding to a zero power CSI-RS; and a receiving unit 21, configured to receive, on the RE to which data is mapped and that is determined by the resource determining unit 20, data transmitted by a base station.

According to the UE provided by the embodiment of the present invention, when a base station transmits data to the UE, REs corresponding to some CSI-RS resources of the UE are used for mapping data. Therefore, the number of REs used for mapping and transmitting data is increased, thereby effectively improving the spectrum efficiency of data transmission.

Optionally, in an embodiment of the present invention, the preset rule includes:

skipping mapping data to an RE corresponding to a non-zero power CSI-RS in a second set of the UE; and mapping data to an RE corresponding to a non-zero power CSI-RS in a first set of the UE, unless the RE is specific RE, where the specific RE includes an RE that is among the REs corresponding to the non-zero power CSI-RS in the first set and overlaps an RE corresponding to a zero power CSI-RS, and an RE that is among the REs corresponding to the non-zero power CSI-RS in the first set and overlaps the RE corresponding to the non-zero power CSI-RS in the second set.

Optionally, in another embodiment of the present invention, the preset rule includes:

mapping data to an RE corresponding to a non-zero power CSI-RS in a first set of the UE, unless the RE is a specific RE, where the specific RE includes an RE that is among the REs corresponding to the non-zero power CSI-RS in the first set and overlaps an RE corresponding to a zero power CSI-RS; and mapping data to an RE corresponding to a non-zero power CSI-RS in a second set of the UE, unless the RE is an RE that overlaps the RE corresponding to the zero power CSI-RS.

Specifically, the first set is a coordinated multi-point CoMP resource management set, and the second set is a coordinated multi-point CoMP measurement set.

In an embodiment of the present invention, the receiving unit 21 is further configured to:

receive RE notification information sent by the base station, where the RE notification information is used for notifying the RE to which data is mapped and/or an RE to which data is not mapped that is determined by the base station; and in this case, the resource determining unit 20 is specifically configured to:

determine, according to the preset rule and the RE to which data is mapped and/or the RE to which data is not mapped that is notified by using the RE notification information, the RE to which data is mapped.

It should be noted that, in an embodiment of the present invention, when the UE receives the RE notification information delivered by the base station, whether the RE notified by using the RE notification information can be used for mapping data is subject to notification of the RE notification information and is not limited by the preset rule, and whether data can be mapped to another RE is subject to a specification in the preset rule. That is, if the preset rule specifies that data is mapped to an RE, but the RE notification information notifies that the RE is the determined RE to which data is not mapped, the resource determining unit 20 determines that data is not mapped to the RE; and if the preset rule specifies that data is not mapped to an RE, but the RE notification information notifies that the RE is the determined RE to which data is mapped, the resource determining unit 20 determines that data is mapped to the RE.

Optionally, when the RE notification information notifies the RE to which data is not mapped, the resource determining unit 20 is specifically configured to:

if an RE is the RE to which data is not mapped that is notified by using the RE notification information, determine that data is not mapped to the RE; and if an RE is not included in the RE to which data is not mapped that is notified by using the RE notification information, determine, according to the preset rule, whether data is mapped or not mapped to the RE.

Optionally, when the RE notification information notifies the RE to which data is mapped, the resource determining unit 20 is specifically configured to:

if an RE is the RE to which data is mapped and that is notified by using the RE notification information, determine that data is mapped to the RE; and if an RE is not included in the RE to which data is mapped that is notified by using the RE notification information, determine, according to the preset rule, whether data is mapped or not mapped to the RE.

Optionally, when the RE notification information notifies the RE to which data is mapped and the RE to which data is not mapped, the resource determining unit 20 is specifically configured to:

if an RE is the RE to which data is not mapped that is notified by using the RE notification information, determine that data is not mapped to the RE;

if an RE is the RE to which data is mapped and that is notified by using the RE notification information, determine that data is mapped to the RE; and if an RE is not included in the REs notified by using the RE notification information, determine, according to the preset rule, whether data is mapped or not mapped to the RE.

In another embodiment of the present invention, the base station skips mapping data to the RE corresponding to the zero power CSI-RS, no matter whether the RE is the RE to which data is mapped and that is notified by using the RE notification information. In this case, optionally, when the RE notification information notifies the RE to which data is not mapped, the resource determining unit 20 is specifically configured to:

if an RE is the RE corresponding to the zero power CSI-RS, determine that data is not mapped to the RE;

if an RE is not the RE corresponding to the zero power CSI-RS, and the RE is the RE to which data is not mapped that is notified by using the RE notification information, determine that data is not mapped to the RE; and if an RE is not the RE corresponding to the zero power CSI-RS, and the RE is not included in the RE to which data is not mapped that is notified by using the RE notification information, determine, according to the preset rule, whether data is mapped or not mapped to the RE.

Optionally, when the RE notification information notifies the RE to which data is mapped, the resource determining unit 20 is specifically configured to:

if an RE is the RE corresponding to the zero power CSI-RS, determine that data is not mapped to the RE;

if an RE is not the RE corresponding to the zero power CSI-RS, and the RE is the RE to which data is mapped and that is notified by using the RE notification information, determine that data is mapped to the RE; and if an RE is not the RE corresponding to the zero power CSI-RS, and the RE is not included in the RE to which data is mapped and that is notified by using the RE notification information, determine, according to the preset rule, whether data is mapped or not mapped to the RE.

Optionally, when the RE notification information notifies the RE to which data is mapped and the RE to which data is not mapped, the resource determining unit 20 is specifically configured to:

if an RE is the RE corresponding to the zero power CSI-RS, determine that data is not mapped to the RE;

if an RE is not the RE corresponding to the zero power CSI-RS, and the RE is the RE to which data is not mapped that is notified by using the RE notification information, determine that data is not mapped to the RE;

if an RE is not the RE corresponding to the zero power CSI-RS, and the RE is the RE to which data is mapped and that is notified by using the RE notification information, determine that data is mapped to the RE; and if an RE is not the RE corresponding to the zero power CSI-RS, and the RE is not included in the REs notified by using the RE notification information, determine, according to the preset rule, whether data is mapped or not mapped to the RE.

A person skilled in the art may understand that functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing unit is implemented in a form of a software functional unit, the unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
determining, according to a preset rule, a resource element to which data is mapped, wherein the preset rule comprises:
mapping data to a resource element corresponding to a non-zero power CSI-RS in a first set, unless the resource element is a specific resource element, wherein the specific resource element comprises a resource element that is among the resource elements corresponding to the non-zero power CSI-RS in the first set and overlaps a resource element corresponding to a zero power CSI-RS; and
receiving, on the determined resource element to which data is mapped, data transmitted by a base station.

2. The method according to claim 1, wherein:
the preset rule further comprises: skipping mapping data to a resource element corresponding to a non-zero power CSI-RS in a second set; and
the specific resource element further comprises a resource element that is among the resource elements corresponding to the non-zero power CSI-RS in the first set and overlaps the resource element corresponding to the non-zero power CSI-RS in the second set; or
the preset rule further comprises: mapping data to a resource element corresponding to a non-zero power CSI-RS in a second set, unless the resource element is a resource element that overlaps the resource element corresponding to the zero power CSI-RS.

3. The method according to claim 1, wherein:
before determining, according to the preset rule, the resource element to which data is mapped, the method further comprises:
receiving resource element notification information sent by the base station, wherein the resource element notification information is used for notifying the base station of the determined resource element to which data is mapped; and
determining, according to the preset rule, the resource element to which data is mapped comprises:
determining, according to the preset rule and the resource element to which data is mapped, which is notified by using the resource element notification information, the resource element to which data is mapped.

4. The method according to claim 1, wherein:
before determining, according to the preset rule, the resource element to which data is mapped, the method further comprises:
receiving resource element notification information sent by the base station, wherein the resource element notification information is used for notifying the base station of a determined resource element to which data is not mapped; and
determining, according to the preset rule, the resource element to which data is mapped comprises:
determining, according to the preset rule and the resource element to which data is not mapped, which is notified by using the resource element notification information, the resource element to which data is mapped.

5. The method according to claim 3, wherein determining, according to the preset rule and the resource element to which data is mapped, which is notified by using the resource element notification information, the resource element to which data is mapped, comprises at least one of the following:
if a resource element is the resource element to which data is mapped that is notified by using the resource element notification information, determining that data is mapped to the resource element;
if a resource element is not comprised in the resource element notified by using the resource element notification information, determining, according to the preset rule, that data is mapped to the resource element;
if a resource element is not the resource element corresponding to the zero power CSI-RS, and the resource element is the resource element to which data is mapped that is notified by using the resource element notification information, determining that data is mapped to the resource element; and
if a resource element is not the resource element corresponding to the zero power CSI-RS, and the resource element is not comprised in the resource element notified by using the resource element notification information, determining, according to the preset rule, that data is mapped the resource element.

6. The method according to claim 4, wherein determining, according to the preset rule and the resource element to which data is not mapped, which is notified by using the resource element notification information, the resource element to which data is mapped, comprises at least one of the following:
if a resource element is the resource element to which data is not mapped that is notified by using the resource element notification information, determining that data is not mapped to the resource element;
if a resource element is not comprised in the resource element notified by using the resource element notification information, determining, according to the preset rule, that data is not mapped to the resource element;
if a resource element is the resource element corresponding to the zero power CSI-RS, determining that data is not mapped to the resource element; and
if a resource element is not the resource element corresponding to the zero power CSI-RS, and the resource element is the resource element to which data is not mapped that is notified by using the resource element notification information, determining that data is not mapped to the resource element.

7. A base station, comprising:
a mapping unit, configured to map, to a resource element according to a preset rule, data that needs to be transmitted to a user equipment, wherein the preset rule comprises:
mapping data to a resource element corresponding to a non-zero power channel state information reference signal CSI-RS in a first set of the user equipment, unless the resource element is a specific resource element, wherein the specific resource element comprises a resource element that is among the resource elements corresponding to the non-zero power CSI-RS in the first set and overlaps a resource element corresponding to a zero power CSI-RS; and
a transmission unit, configured to transmit, to the user equipment, the data mapped by the mapping unit.

8. The base station according to claim 7, wherein:
the preset rule further comprises: skipping mapping data to a resource element corresponding to a non-zero power CSI-RS in a second set of the user equipment, wherein:
the specific resource element further comprises a resource element that is among the resource elements corresponding to the non-zero power CSI-RS in the first set and overlaps the resource element corresponding to the non-zero power CSI-RS in the second set; or the preset rule further comprises: mapping data to a resource element corresponding to a non-zero power CSI-RS in a second set of the user equipment, unless the resource element is a resource element that overlaps the resource element corresponding to the zero power CSI-RS.

9. The base station according to claim 7, further comprising:
a determining unit, configured to determine a resource element to which data to be transmitted to the user equipment is mapped;
wherein the mapping unit is configured to map, to the resource element according to the preset rule and the determined resource element to which data is mapped, the data that needs to be transmitted to the user equipment; and
wherein the transmission unit is further configured to send resource element notification information to the user equipment, wherein the resource element notification information is used for notifying the user equipment of the resource element to which data is mapped that is determined by the determining unit.

10. The base station according to claim 7, further comprising:
a determining unit, configured to determine a resource element to which data to be transmitted to the user equipment is not mapped;
wherein the mapping unit is configured to map, to the resource element according to the preset rule and the determined resource element to which data is not mapped, the data that needs to be transmitted to the user equipment; and
wherein the transmission unit is further configured to send resource element notification information to the user equipment, wherein the resource element notification information is used for notifying the user equipment of the resource element to which data is not mapped that is determined by the determining unit.

11. The base station according to claim 9, wherein the mapping unit is configured to perform at least one of the following:
if a resource element is the determined resource element to which data is mapped, map data to the resource element;
if a resource element is not comprised in the determined resource element, map data to the resource element according to the preset rule;
if a resource element is not the resource element corresponding to the zero power CSI-RS, and the resource element is the determined resource element to which data is mapped, map data to the resource element; and
if a resource element is not the resource element corresponding to the zero power CSI-RS, and the resource element is not comprised in the determined resource element, map data to the resource element according to a specification in the preset rule.

12. The base station according to claim 10, wherein the mapping unit is configured to perform at least one of the following:
if a resource element is the determined resource element to which data is not mapped, skip mapping data to the resource element;
if a resource element is not comprised in the determined resource element, skip mapping data to the resource element according to the preset rule;

if a resource element is the resource element corresponding to the zero power CSI-RS, skip mapping data to the resource element;
if a resource element is not the resource element corresponding to the zero power CSI-RS, and the resource element is the determined resource element to which data is not mapped, skip mapping data to the resource element; and
if a resource element is not the resource element corresponding to the zero power CSI-RS, and the resource element is not comprised in the determined resource element, skip mapping data to the resource element according to a specification in the preset rule.

13. A user equipment, comprising:
a resource determining unit, configured to determine, according to a preset rule, a resource element to which data is mapped, wherein the preset rule comprises:
mapping data to a resource element corresponding to a non-zero power CSI-RS in a first set, unless the resource element is a specific resource element, wherein the specific resource element comprises a resource element that is among the resource elements corresponding to the non-zero power CSI-RS in the first set and overlaps a resource element corresponding to a zero power CSI-RS; and
a receiving unit, configured to receive, on the resource element to which data is mapped that is determined by the resource determining unit, data transmitted by a base station.

14. The user equipment according to claim 13, wherein:
the preset rule further comprises: skipping mapping data to a resource element corresponding to a non-zero power CSI-RS in a second set, wherein:
the specific resource element further comprises a resource element that is among the resource elements corresponding to the non-zero power CSI-RS in the first set and overlaps the resource element corresponding to the non-zero power CSI-RS in the second set; or
the preset rule further comprises: mapping data to a resource element corresponding to a non-zero power CSI-RS in a second set, unless the resource element is a resource element that overlaps the resource element corresponding to the zero power CSI-RS.

15. The user equipment according to claim 13, wherein:
the receiving unit is further configured to:
receive resource element notification information sent by the base station, wherein the resource element notification information is used for notifying a resource element to which data is mapped, which is determined by the base station; and
the resource determining unit is configured to:
determine, according to the preset rule and the resource element to which data is mapped, which is notified by using the resource element notification information, the resource element to which data is mapped.

16. The user equipment according to claim 13, wherein:
the receiving unit is further configured to:
receive resource element notification information sent by the base station, wherein the resource element notification information is used for notifying a resource element to which data is not mapped, which is determined by the base station; and
the resource determining unit is configured to:
determine, according to the preset rule and the resource element to which data is not mapped, which is notified by using the resource element notification information, the resource element to which data is mapped.

17. The user equipment according to claim 15, wherein the resource determining unit is configured to perform at least one of the following:
- if a resource element is the resource element to which data is mapped that is notified by using the resource element notification information, determine that data is mapped to the resource element; and
- if a resource element is not comprised in the resource element notified by using the resource element notification information, determine, according to the preset rule, that data is mapped to the resource element;
- if a resource element is not the resource element corresponding to the zero power CSI-RS, and the resource element is the resource element to which data is mapped that is notified by using the resource element notification information, it is determined that data is mapped to the resource element; and
- if a resource element is not the resource element corresponding to the zero power CSI-RS, and the resource element is not comprised in the resource element notified by using the resource element notification information, it is determined, according to the preset rule, that data is mapped to the resource element.

18. The user equipment according to claim 16, wherein the resource determining unit is configured to perform at least one of the following:
- if a resource element is the resource element to which data is not mapped that is notified by using the resource element notification information, determine that data is not mapped to the resource element;
- if a resource element is not comprised in the resource element notified by using the resource element notification information, determine, according to the preset rule, that data is not mapped to the resource element;
- if a resource element is the resource element corresponding to the zero power CSI-RS, it is determined that data is not mapped to the resource element;
- if a resource element is not the resource element corresponding to the zero power CSI-RS, and the resource element is the resource element to which data is not mapped that is notified by using the resource element notification information, it is determined that data is not mapped to the resource element; and
- if a resource element is not the resource element corresponding to the zero power CSI-RS, and the resource element is not comprised in the resource element notified by using the resource element notification information, it is determined, according to the preset rule, that data is not mapped to the resource element.

* * * * *